United States Patent [19]

Taricco

[11] 4,294,609

[45] Oct. 13, 1981

[54] PROCESS FOR THE REDUCTION OF IRON OXIDE

[75] Inventor: Stefano Taricco, Turin, Italy

[73] Assignee: Centro Ricerche Fiat S.p.A., Turin, Italy

[21] Appl. No.: 150,113

[22] Filed: May 15, 1980

[30] Foreign Application Priority Data

Jun. 25, 1979 [IT] Italy .............................. 68346 A/79

[51] Int. Cl.$^3$ .............................................. C21B 13/14
[52] U.S. Cl. ...................................................... 75/34
[58] Field of Search ............................................ 75/34

[56] References Cited

U.S. PATENT DOCUMENTS 3,419,383 12/1968 Hatcher et al. ......................... 75/34

Primary Examiner—M. J. Andrews
Attorney, Agent, or Firm—Sughrue, Mion, Zinn, Macpeak and Seas

[57] ABSTRACT

A process for reducing powdered iron oxides obtained from rolling scales formed in the hot-rolling of steel includes heating the oxides in a reducing atmosphere at 600° C. to 650° C. to convert the particles to a porous form which allows the reducing gas to penetrate to the center of the particles and completing the reduction to iron at 900° C. to 1100° C.

5 Claims, No Drawings

PROCESS FOR THE REDUCTION OF IRON OXIDE

DESCRIPTION

The present invention relates to a process for reducing iron oxide, particularly in the production of iron powders usable in powder metallurgy; the process is particularly suitable for use in converting rolling scales formed during the hot-rolling of iron and steel into such iron powders.

Considerable quantities of rolling scales, which consist essentially of iron oxides, are produced during hot-rolling, which is one of the steps involved in the semi-machining of steel to form manufactured articles. Various processes have already been proposed for reducing these rolling scales to form iron powders, these processes including first crushing the scales to form a powder and then heating the crushed material in the presence of a reducing agent. This latter agent may be in the solid state, for example carbon coke or anthracite which is intimately mixed with the oxide powder, but processes of this type have a serious disadvantage in that they produce an impure material, if only because an excess of the reducing agent is used to facilitate the reduction.

Processes have also been proposed for using a gaseous reducing agent, such as hydrogen or carbon monoxide. These should ensure the absence of carbonaceous residues in the final product but processes of this type have not, until now, achieved satisfactory practical results, nor found any specific use in industry, because of the difficulties encountered in achieving complete reduction of the iron oxides throughout the whole mass of the treated material.

In an attempt to resolve the disadvantages of both the above types of process it has also been proposed to use reducing agents in the gaseous state and in the solid state simultaneously, the solid state agent possibly consisting of carbon coke (see U.S. Pat. No. 2,759,808) or a powdered carbon-iron alloy, particularly white cast iron (see French Pat. No. 951,561).

This combination of reducing agents is not, however, very convenient and the present applicants have carried out further tests on the use of gaseous reducing agents alone. Experiments carried out in the laboratory have shown that it is possible to obtain an iron powder containing a residual oxygen content of less than 0.3% by weight by heating powdered iron-oxide in an oven in a reducing atmosphere at temperatures greater than 950° C. However this result was achieved with sophisticated operating conditions which are not attainable in industry. In general, it was found that, when the oxide was heated quickly to high temperatures, of the order of 900° C. to 1100° C., the surface layers of the particles were reduced immediately, forming metallic shells which were impermeable to gas and prevented the subsequent reduction of the oxides at the heart of the particles.

The object of the present invention is to provide a process for reducing iron oxides with a gaseous reducing agent on a commercial scale which results in the production of high quality iron.

According to the present invention there is provided a process for the reduction of particulate iron oxide in which the oxide is heated in a reducing atmosphere, at a temperature and for a time sufficient to convert the particles to a porous form which allows thorough penetration by the reducing gas, and the temperature is then increased for a further time interval to complete the reduction of the iron oxide to iron.

The process of the invention thus makes use of two reduction stages:

a first stage in which the iron oxide is heated at a lower temperature, preferably between 600° C. and 650° C. for one hour, to convert the particles to a porous form and prevent the formation of a compact, outer shell of metal, so that the reducing gas can subsequently penetrate right to the hearts of the particles; and a second stage, in which the porous particles are substantially completely reduced, preferably at a temperature of between 900° C. and 1100° C. for one hour.

Rolling scales for the hot-rolling of steel may conveniently be used as the starting material for the above process, after crushing to form particles, preferably having a grain size not greater than 750 microns. Non-ferrous impurities would preferably be separated magnetically before the reduction process.

During the reduction process some agglomeration of the particles normally takes place and, after cooling in a reducing atmosphere, the reduced material would again be crushed if it is to be used in powder metallurgy.

One embodiment of the invention will now be more particularly described, by way of example.

Rolling scales formed during the hot-rolling of iron or steel are used as a starting material for the process of the invention. These scales consist essentially of iron oxide, partly in the powder state and partly in the form of agglomerates of various sizes, the nature of the oxide or oxides present depending on the temperature of formation of the scales themselves: in some cases the iron oxide is mainly magnetite ($Fe_3O_4$), while in other cases it is mainly ferric oxide ($Fe_2O_3$) or ferrous oxide ($FeO$). When the rolling scales are formed in the hot-rolling of rods, that is steel bars of circular section, they are in the form of small curved plates having a radius of curvature corresponding to the radius of the rod itself.

The rolling scales are first crushed in known apparatus to form a powder having a grain size of less than 750 microns: there is no particular difficulty in carrying out this operation as the scales are very friable.

The iron oxide powders are then separated magnetically from non-ferrous impurities (for example from abrasives which are usually mixed with the rolling scales) and the resulting purified oxide powder is conveyed to an oven for reduction in a reducing atmosphere.

A tunnel-type oven is used for heating the oxide. The reducing gas may, for example, comprise carbon monoxide, dissociated ammonia or hydrogen. The thickness of the layer of material which is passed through the tunnel-oven depends on the quantity of reducing gas used.

The oxide is heated in the reducing atmosphere in two stages: in the first stage the material is maintained for about one hour at a temperature of the order of 600° to 650° C. and in the second stage it is maintained for about one hour at a temperature of between 900° C. and 1100° C.

In the first stage, substantially every particle of the powder is converted into a porous state which allows the reducing gas to penetrate right to the heart of the particle. The second stage then completes the reduction of the oxide throughout the whole mass of the particles.

Subsequently the material is cooled, still in a reducing atmosphere, so as to avoid the reformation of iron oxide. The cooled material is then re-crushed and pulverised to a grain size suitable for its subsequent, intended use and, finally, any remaining non-ferrous impurities are removed by a further magnetic-separation treatment to leave an iron powder, usable in powder metallurgy, as the end product.

What is claimed is:

1. A process for the reduction of particulate iron oxide, wherein said iron oxide is heated continuously in an atmosphere of reducing gas as the sole reducing agent at a temperature between 600° C. and 650° C. for about one hour to convert the particles of said iron oxide to a porous form which allows thorough penetration by said reducing gas and than at a temperature between 900° C. and 1100° C. for about one hour to complete the reduction of said iron oxide to iron.

2. A process as claimed in claim 1, wherein said reducing gas is selected from carbon monoxide, dissociated ammonia and hydrogen.

3. A process as in claim 1, wherein said iron oxide particles have a grain size of less than 750 microns.

4. A process as in claim 1, and further including the production of said particulate iron oxide by means of crushing iron-oxide scales formed during the hot-rolling of steel to a powder and magnetically separating said particulate iron oxide from non-ferrous impurities in said powder.

5. A process as in claim 1, and further including the steps of cooling said iron obtained from the reduction process in a reducing atmosphere, crushing the cooled material to a powder and magnetically separating non-ferrous impurities from the powder to obtain an iron powder usable in powder metallurgy.

* * * * *